United States Patent
Rousseau

(10) Patent No.: US 10,649,238 B2
(45) Date of Patent: May 12, 2020

(54) HEAD MOUNTED DEVICE INTENDED TO BE WORN BY A WEARER

(71) Applicant: Essilor International, Charenton-le-Pont (FR)

(72) Inventor: Denis Rousseau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/568,566

(22) PCT Filed: May 17, 2016

(86) PCT No.: PCT/EP2016/060986
§ 371 (c)(1),
(2) Date: Oct. 23, 2017

(87) PCT Pub. No.: WO2016/184838
PCT Pub. Date: Nov. 24, 2016

(65) Prior Publication Data
US 2018/0113329 A1 Apr. 26, 2018

(30) Foreign Application Priority Data
May 21, 2015 (EP) .................................... 15305767

(51) Int. Cl.
*G02C 1/00* (2006.01)
*G02C 11/00* (2006.01)
(Continued)

(52) U.S. Cl.
CPC ............ *G02C 11/10* (2013.01); *G02B 27/017* (2013.01); *G02C 13/001* (2013.01); *H02J 7/025* (2013.01); *H02J 50/10* (2016.02)

(58) Field of Classification Search
CPC . G02C 5/001; G02C 5/02; G02C 5/14; G02C 5/22; G02C 11/00; G02C 11/04;
(Continued)

(56) References Cited

U.S. PATENT DOCUMENTS 8,217,856 B1 7/2012 Petrou
9,801,709 B2 * 10/2017 Blum .................... A61F 2/1627
(Continued)

FOREIGN PATENT DOCUMENTS

| EP | 2 387 129 A2 | 11/2011 |
| EP | 2 429 058 A2 | 3/2012 |

(Continued)

OTHER PUBLICATIONS

International Search Report dated Sep. 1, 2016, in PCT/EP2016/060986 filed May 17, 2016.

*Primary Examiner* — Mustak Choudhury
(74) *Attorney, Agent, or Firm* — Oblon, McClelland, Maier & Neustadt, L.L.P.

(57) ABSTRACT

A head mounted device intended to be worn by a wearer comprising: —a battery, and —a flexible wireless power system receiver connected to the battery through at least one electrical connection mean, the flexible wireless power system receiver being arranged to receive an electromagnetic field so as to allow charging of the battery through the electrical connection means.

6 Claims, 4 Drawing Sheets

(51) Int. Cl.
*H02J 7/02* (2016.01)
*H02J 50/10* (2016.01)
*G02B 27/01* (2006.01)
*G02C 13/00* (2006.01)

(58) Field of Classification Search
CPC ........ G02C 11/06; G02C 11/10; G02C 7/083;
G02C 7/06; G02C 7/061; G02C 7/08;
G02C 7/101; G02C 7/102; G02B 27/017;
G02F 1/134309; G02F 1/1345; G02F
1/13452; G02F 1/29; G02F 1/133371;
G02F 1/133553; G02F 1/1333; G02F
1/13334; G02F 1/1347; H03K 17/94;
H01R 35/04; H01R 13/665; H01R 3/00;
H02J 7/025; H02J 7/0044; H02J 50/10;
H04N 13/337; H04N 13/398; H04N
13/378; H04N 13/289; H04N 13/194;
H04N 13/189
USPC ...... 351/41, 44, 111, 132, 133, 158, 159.03,
351/159.19, 159.39, 159.41
See application file for complete search history.

(56) References Cited

U.S. PATENT DOCUMENTS

| | | |
|---|---|---|
| 2011/0050164 A1 | 3/2011 | Partovi et al. |
| 2011/0141357 A1 | 6/2011 | Price et al. |
| 2012/0062173 A1 | 3/2012 | Choi et al. |
| 2012/0155064 A1* | 6/2012 | Waters .................. A42B 1/242 |
| | | 362/103 |
| 2012/0223674 A1* | 9/2012 | Choi ....................... H01F 38/14 |
| | | 320/108 |
| 2013/0027572 A1 | 1/2013 | Petrou |
| 2013/0093388 A1 | 4/2013 | Partovi |
| 2013/0141037 A1 | 6/2013 | Jenwatanavet et al. |
| 2013/0260677 A1 | 10/2013 | Partovi |
| 2016/0070105 A1 | 3/2016 | Tannoudiji et al. |

FOREIGN PATENT DOCUMENTS

| | | |
|---|---|---|
| WO | 97/24638 A1 | 7/1997 |
| WO | 2014/174067 A1 | 10/2014 |

* cited by examiner

HEAD MOUNTED DEVICE INTENDED TO BE WORN BY A WEARER

FIELD OF THE INVENTION

The invention relates to a head mounted device intended to be worn by a wearer and to a maintaining device for maintaining such head mounted device. The invention further relates to an optical lens member and to a method for charging the battery of a head mounted device.

BACKGROUND OF THE INVENTION

More and more head mounted devices comprise electronic devices requiring to be powered by a battery.

Such battery requires being charged periodically. Since the weight is an issue for head mounted devices the batteries comprised in such devices cannot be too heavy, thus limiting the capacity of such batteries.

The existing head mounted devices comprise a connector device allowing the user to charge the battery of the head mounted device by connecting the device to a power source.

Wireless charging system exists for smart phones. Such wireless charging system comprises a transmitter connected to a power source that transmits the power to a receiver via an electromagnetic field. For the receiver to efficiently receive the electromagnetic field and convert such electromagnetic field into electrical power it is required that the diameter of the receiver be of at least 30 mm.

Although, such dimension requirement is general acceptable for a smart phone or a connected watch, head mounted device usually do not comprise a 30 mm diameter surface for receiving such wireless power system receiver.

Reducing the dimensions of the wireless power system receiver reduces dramatically the performance of the power system.

Thus there is a need for a head mounted device whose battery can be charged via a wireless power system receiver.

One object of the present invention is to provide such a head mounted device.

SUMMARY OF THE INVENTION

To this end, the invention proposes a head mounted device intended to be worn by a wearer comprising:
 a battery, and
 a flexible wireless power system receiver connected to the battery through at least one electrical connection mean, the flexible wireless power system receiver being arranged to receive an electromagnetic field so as to allow charging of the battery through the electrical connection means.

Advantageously, having a wireless power system receiver that is flexible allows reducing the overall size of the wireless power system receiver. Indeed, the wireless power system receiver can be arranged between a deployed position in which the receiver can effectively receive an electromagnetic field so as to allow charging of the battery and a stored position in which the wireless power system receiver has a reduced overall size so as to reduce the dimension of the head mounted device.

More particularly, the invention proposes a head mounted device intended to be worn by a wearer comprising:
 a battery, and
 a wireless power system receiver connected to the battery through at least one electrical connection mean, the wireless power system receiver being arranged to receive an electromagnetic field so as to allow charging of the battery through the electrical connection means,
 wherein the wireless power system receiver is flexible and can be arranged between
 a deployed position in which the receiver can effectively receive an electromagnetic field so as to allow charging of the battery, and
 a stored position in which the wireless power system receiver has a reduced overall size so as to reduce the dimension of the head mounted device.

In particular, the receiver is sufficiently flexible to move from the deployed position to the stored position.

More particularly, the receiver is moved from the deployed position to the stored position by pressing a resilient receiver, folding the receiver and/or rolling the receiver.

According to further embodiments which can be considered alone or in combination:
 the flexible wireless power system receiver comprises an electrical circuit printed on a flexible support; and/or
 the wireless power system receiver is configured for inductive coupling; and/or
 the wireless power system receiver comprises at least an inductive coil; and/or
 the wireless power system receiver comprises at least a spring inductive coil and/or a rollable inductive coil and/or a foldable inductive coil; and/or
 the head mounted device comprise at least an optical lens mounted and the wireless power system receiver is arranged in the optical lens.

The invention also related to an optical lens member comprising a wireless power system receiver arranged to be electrically connected to a charge.

Advantageously, the optical lens member according to the invention may be mounted to a head mounted device and electrically connected to a battery charging circuit so as to provide a wireless power system receiver.

More particularly, the invention also relates to an optical lens member comprising a wireless power system receiver arranged to be electrically connected to a battery charging device, wherein the optical lens member is an optical lens blank, a semi-finished optical lens, a finished optical lens with or without coating or an edged optical lens.

According to further embodiments which can be considered alone or in combination:
 the wireless power system receiver comprises a conductor arranged at least in one of the following ways:
  on the front surface of the optical lens member,
  on the rear surface of the optical lens member,
  on a surface of the optical lens member comprised between the front and rear surfaces,
  around the edge of the optical lens member; and/or
 the wireless power system receiver is configured for inductive coupling; and/or
 the wireless power system receiver comprises at least an inductive coil; and/or
 the wireless power system receiver is made of a transparent conductive, for example indium tin oxyde and/or graphene and/or silver nanowires; and/or
 the optical lens member is a finished optical lens and the wireless power system receiver is positioned so that when the finished optical lens is edged to be mounted in a spectacle frame, the wireless power system receiver remains on the edged optical lens without causing any discomfort to the wearer of the optical lens; and/or the optical lens member is a semi-finished optical lens or a lens blank and the wireless power system receiver is positioned so that when an optical lens is manufactured from the optical lens member, the wireless power system receiver remains on the optical lens without causing any discomfort to the wearer of the optical lens; and/or the optical lens member is an edged optical lens edged so to be mounted in a spectacle frame and the wireless power system receiver is positioned around the edge of the edged optical lens.

The invention further relates to maintaining device arranged to maintain a head mounted device according to the invention in a position allowing the flexible wireless power system receiver to receive an electromagnetic field so as to charge the battery of the head mounted device.

The invention also relates to a method for charging the battery of a head mounted device according to the invention, comprising:

a positioning step, during which the head mounted device is positioned at a charging distance from a wireless power system transmitter device comprising a power source and a transmitter configured to convert the power provided by the power source to a time-varying electromagnetic field, a receiving configuration step, during which the flexible wireless power system receiver of the head mounted device is configured so as to receive an electromagnetic field from a wireless power system transmitter.

The charging distance may be smaller than or equal to the larger diameter of the flexible wireless power system receiver.

The invention further relates to an optical equipment comprising at least:

a spectacle frame, a battery, and an optical lens member according to the invention, wherein the optical lens member is mounted in the spectacle frame and the wireless power system receiver is electrically connected to the battery.

The invention also relates to a method for manufacturing an optical lens member according to the invention, comprising:

an edged optical lens providing step during which a edged optical lens is provided, a wireless power system receiver providing step during which an inductive coil is arranged around the edge of the edged optical lens.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
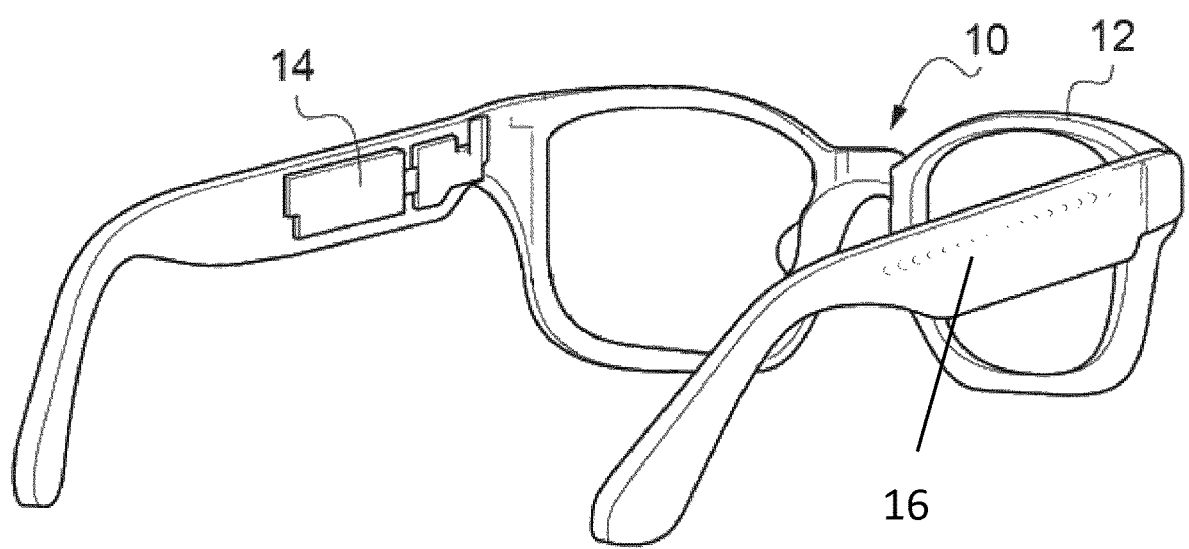
FIG. 1 is a schematic representation of head mounted device according to the invention.

FIG. 1 represents an example of head-mounted device 10 comprising a spectacle frame 12, a battery 14 and a flexible wireless power system receiver 16 connected to the battery 14 through at least one electrical connection means not represented on FIG. 1.

The flexible wireless power system receiver 16 may be connected to the battery via an electronic circuit managing the battery charge.

The battery may be a Lithium Ion type battery or any other technology like super-capacitor or similar technology allowing storing electrical energy.

Although not represented the head mounted device 10 may further comprises a processing unit and/or other electronics arranged for example to receive and process data collected by the sensors mounted on the spectacle frame. The processing unit and/or other electronics may be arranged in one of the sides of the spectacle frame.

Advantageously, such head mounted device being included in a spectacle frame the wearer may use the device over long periods without being hindered.

Although, in FIG. 1 the wireless power system receiver 16 is represented on the opposite side from the battery 14, the battery 14 and the wireless power system receiver 16 may be on the same side so as to facilitate the electrical connection between them.

The flexible wireless power receiver 16, may be arranged between a deployed position and a stored position.

In the deployed position the wireless power receiver can effectively receive an electromagnetic field so as to allow charging of the battery and in the stored position the wireless power system receiver has a reduced overall size so as to reduce the dimension of the head mounted device.

According to an embodiment of the invention, the flexible wireless power system receiver comprises an electrical circuit printed on a flexible support.

The flexible wireless power system receiver is preferably configured for inductive coupling, for example the flexible wireless power system receiver comprises an inductive coil.

Typically, in inductive coupling power is transferred between inductive coils via a magnetic field. The transmitter and receiver coils form together a transformer. An alternating current is generated through the transmitter coil and creates a magnetic field. The magnetic field passes through the receiving coil, where it creates a current in the receiver. The induced current may be used to charge a battery.

Figure 2A:
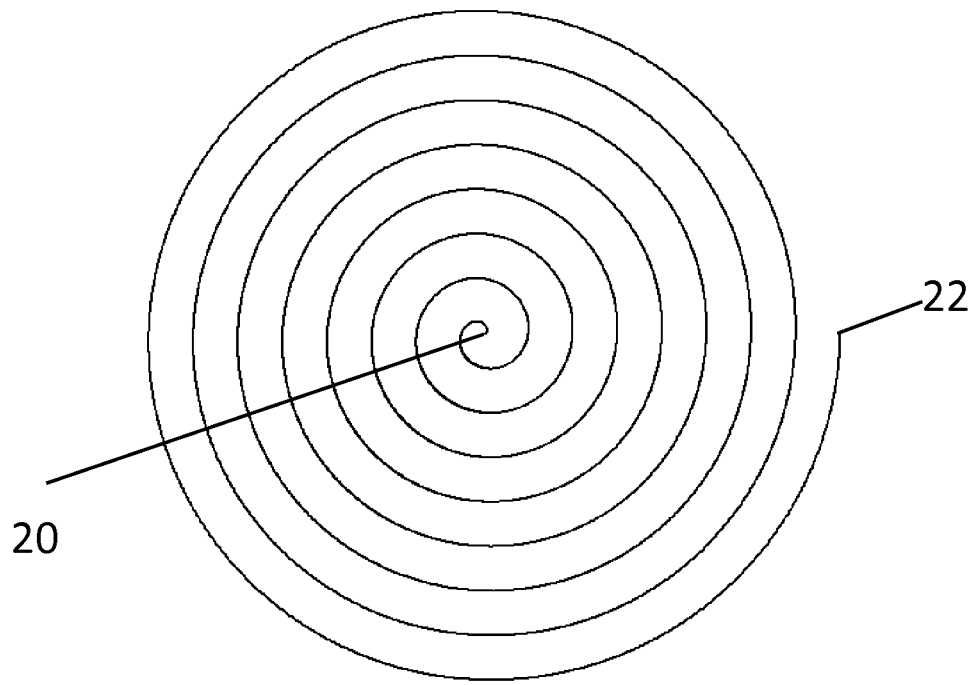
FIGS. 2a and 2b are schematic representation of a flexible wireless power system receiver according to an embodiment of the invention.
Figure 2B:
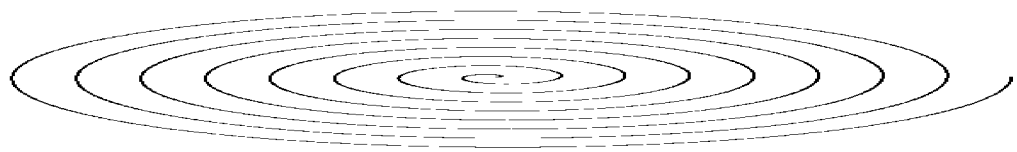

As illustrated on FIGS. 2a and 2b, the wireless power system receiver may comprise at least a spring conductive coil arranged between a relaxed position illustrated in FIG. 2a and a compressed position illustrated in FIG. 2b.

The wireless power system receiver comprises two contact points 20, 22 electrically connected to the charging circuits of the battery of the head mounted device.

As illustrated in FIG. 2a, in the relaxed position, the wireless power system receiver has a shape allowing the wireless power system receiver to receive an electromagnetic field.

In the compressed position illustrated in FIG. 2b, the wireless power system receiver is compressed so as to reduce the size of the wireless power system receiver and receive an electromagnetic field in a non-efficient way.

Figure 3A:
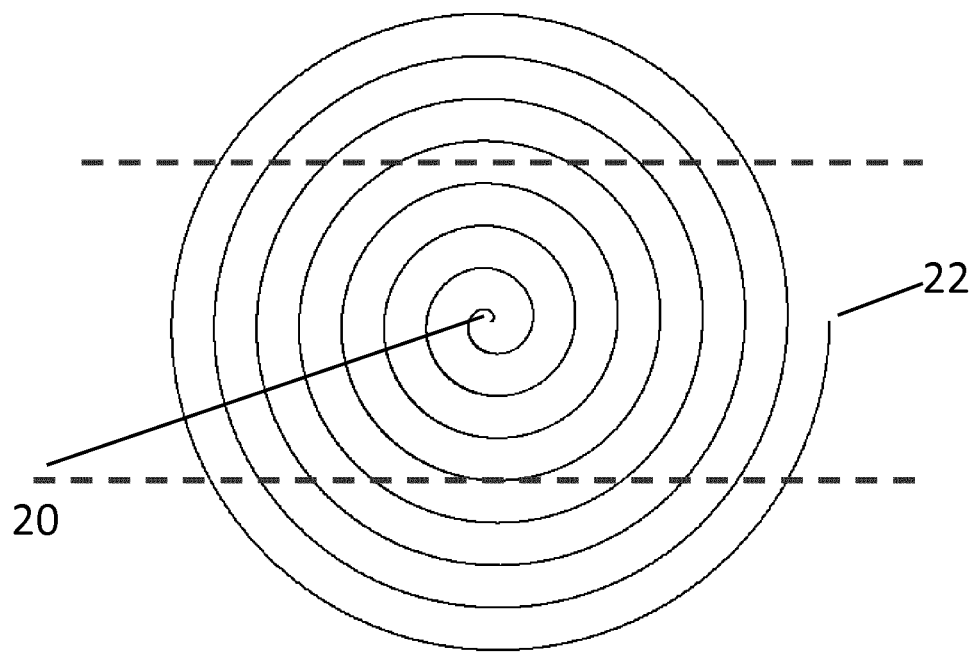
FIGS. 3a and 3b are schematic representation of a flexible wireless power system receiver according to an embodiment of the invention.
Figure 3B:
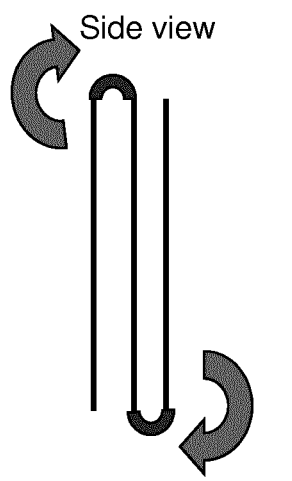

As illustrated on FIGS. 3a and 3b, the wireless power system receiver may comprise at least a foldable conductive coil arranged between an unwrapped position illustrated in FIG. 3a and a wrapped position illustrated in FIG. 3b.

The wireless power system receiver comprises two contact points 20, 22 electrically connected to the charging circuit of the battery of the head mounted device.

As illustrated in FIG. 3a, in the unwrapped position, the wireless power system receiver has a shape allowing the wireless power system receiver to receive an electromagnetic field.

In the wrapped position illustrated in FIG. 3b, the wireless power system receiver is compressed so as to reduce the size of the wireless power system receiver and receive an electromagnetic field in a non-efficient way.

As illustrated on FIG. 1, the head mounted device comprises optical lenses mounted.

According to an embodiment of the invention the wireless power system receiver may be arranged in the optical lens.

The invention further relates to an optical lens member comprising a wireless power system receiver arranged to be electrically connected to a charge.

In the sense of the invention, an "optical lens member" may refer to optical lens blank, a semi-finished optical lens, a finished optical lens with or without coating or an edged optical lens.

According to one aspect of the invention, the head mounted device comprises at least an optical lens mounted and the wireless power system receiver is arranged in the optical lens.

Advantageously, such a flexible receiver enables to bend the receiver to cooperate with a curved surface of the optical member.

Figure 4:
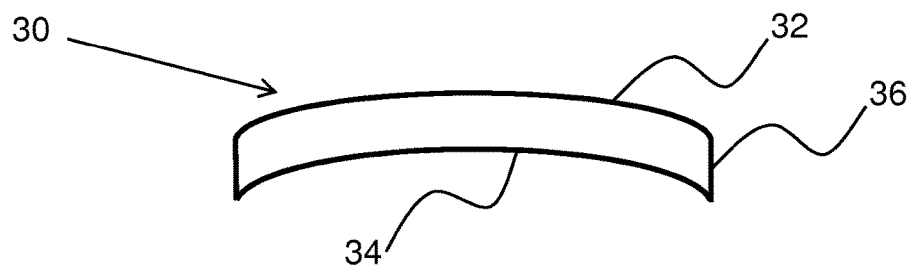
FIG. 4 illustrates an optical lens according to an embodiment of the invention.

As illustrated on FIG. 4, an optical lens member 30 comprises a first optical surface 32, a second optical surface 34 and an external periphery surface 36 connecting the first 32 and second 34 optical surfaces.

While in FIG. 4, the first optical surface is the front surface of the optical lens and the second optical surface is the back surface, it will be understood, that in alternative embodiments of the invention the first optical surface may be the back surface of the optical lens and the second optical surface may be the front surface.

Furthermore, although the first optical surface 32 is represented in FIG. 4 as convex and the second optical surface 34 as concave, it will be appreciated that the first optical surface 32 could equally well be concave or any other curved surface and that the second optical surface 34 could equally well be convex or any other curved surface.

So as to get the best out of the surface of the optical lens, the wireless power system receiver may comprises a conductor arranged at least in one of the following ways:
on the front surface of the optical lens member,
on the rear surface of the optical lens member,
on a surface of the optical lens member comprised between the front and rear surfaces,
around the edge of the optical lens member, for example around the external periphery surface.

Preferably, the wireless power system receiver is configured for inductive coupling, for example the wireless power system receiver comprises at least an inductive coil.

Typically, the wireless power system receiver is made of a transparent conductive, for example indium tin oxide and/or grapheme and/or silver nanowires.

According to an embodiment of the invention, the optical lens member may be a finished optical lens and the wireless power system receiver is positioned so that when the finished optical lens is edged to be mounted in a spectacle frame, the wireless power system receiver remains on the edged optical lens without causing any discomfort to the wearer of the optical lens.

According to a further embodiment of the invention, the optical lens member is a semi-finished optical lens or a lens blank and the wireless power system receiver is positioned so that when an optical lens is manufactured from the optical lens member, the wireless power system receiver remains on the optical lens without causing any discomfort to the wearer of the optical lens.

According to a further embodiment of the invention, the optical lens member is an edged optical lens, i.e. edged so to be mounted in a spectacle frame, and the wireless power system receiver is positioned around the edge of the edged optical lens.

Figure 5:
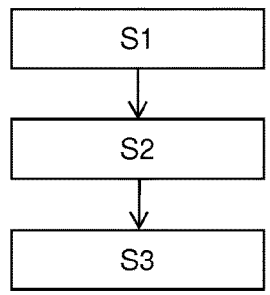
FIG. 5 is a flow chart representing a method according to the invention.

As illustrated on FIG. 5, the invention further relates to a method for charging the battery of a head mounted device according to the invention. The method comprises:
a positioning step S1,
a receiving configuration step S2, and
a charging step S3.

Figure 6:
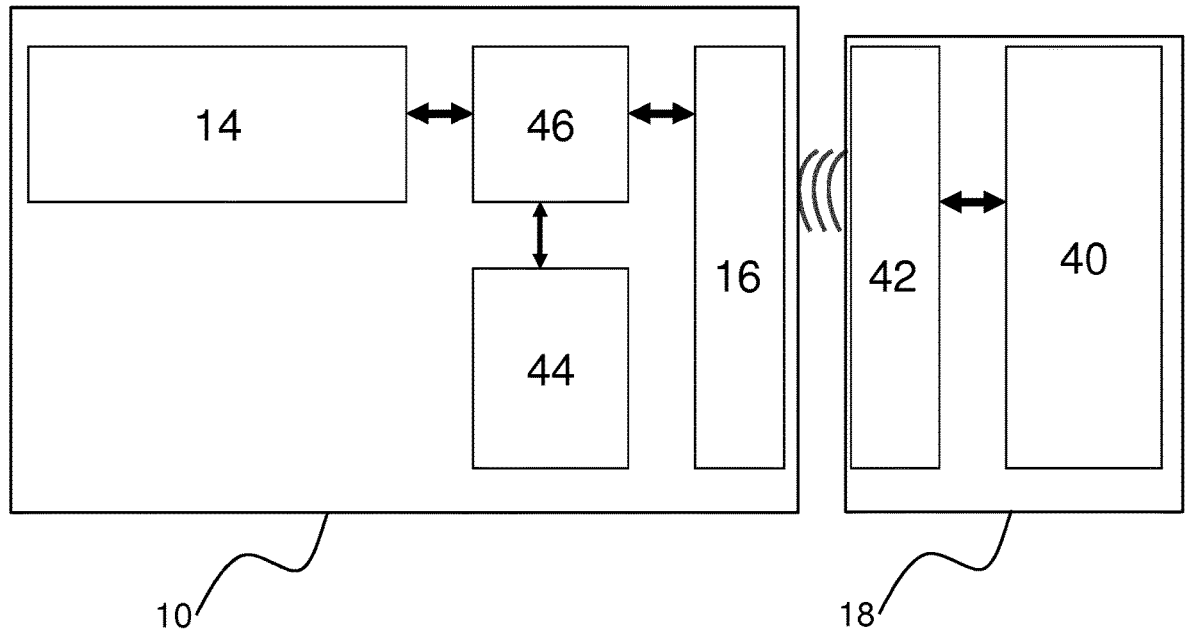
FIG. 6 is a schematic representation of a wireless power system.

FIG. 6 is a schematic representation of a head mounted device 10 when charging the battery using a wireless power transmitter device 18.

During the positioning step S1, the head mounted device 10 is positioned at a charging distance from a wireless power system transmitter device 18. Typically, the wireless power system transmitter device 18 comprises a power source 40 and a transmitter 42 configured to convert the power provided by the power source to a time-varying electromagnetic field. When the wireless power system receiver is configured for inductive coupling, the transmitter typically comprises an inductive coil.

So as to assure a good efficiency of the charging of the battery, the charging distance may be smaller than or equal to the larger diameter of the flexible wireless power system receiver.

During the positioning step S2, the flexible wireless power system receiver 16 of the head mounted device is configured to as to receive an electromagnetic field from a wireless power system transmitter. Typically, a battery charging protocol management 44 manages the battery charging circuits 46 that connect the wireless power system receiver 16 with the battery 14.

For example the Qi or iQi wireless charging protocol defined by the Wireless Power Consortium can be applied to charge the head mounting device, and standard charging devices used for mobile phones can be used to charge the head mounting device. Other protocol defined by the Alliance for Wireless Power could also be used.

During the charging step S3, the wireless power system receiver receives a time-varying electromagnetic field that generates a current that is received by the battery charging circuits 46 so as to charge the battery 14.

The invention also relates to a maintaining device arranged to maintain a head mounted device according to the invention in a position allowing the flexible wireless power system receiver to receive an electromagnetic field so as to charge the battery of the head mounted device.

The invention has been described above with the aid of embodiments without limitation of the general inventive concept; in particular the mounted sensing device is not limited to a head mounted device.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A head mounted device intended to be worn by a wearer comprising: a battery, and a flexible wireless power system receiver connected to the battery through at least one electrical connection, the flexible wireless power system receiver being arranged to receive an electromagnetic field from a wireless power system transmitter to allow charging of the battery through the electrical connection, wherein the flexible wireless power system receiver is arrangeable between a deployed position in which the receiver effectively receives an electromagnetic field to allow charging of the battery and a stored position in which the wireless power system receiver has a reduced overall size to reduce the dimension of the head mounted device.

2. The head mounted device according to claim 1, wherein the wireless power system receiver is configured for inductive coupling.

3. The head mounted device according to claim 2, wherein the wireless power system receiver comprises at least a spring inductive coil and/or a rollable inductive coil and/or a foldable inductive coil.

4. The head mounted device according to claim 1, wherein the head mounted device comprises at least an optical lens mounted and the wireless power system receiver is arranged in the optical lens.

5. A method for charging the battery of a head mounted device wearable by a wearer, the head mounted device including: a battery, and a flexible wireless power system receiver connected to the battery through at least one electrical connection, the flexible wireless power system receiver being arranged to receive an electromagnetic field to allow charging of the battery through the electrical connection, wherein the flexible wireless power system receiver is arrangeable between a deployed position in which the receiver effectively receives an electromagnetic field to allow charging of the battery and a stored position in which the wireless power system receiver has a reduced overall size to reduce the dimension of the head mounted device, the method comprising:

positioning the head mounted device at a charging distance from a wireless power system transmitter device comprising a power source and a transmitter configured to convert the power provided by the power source to a time-varying electromagnetic field; and receiving, at the flexible wireless power system receiver of the head mounted device, an electromagnetic field from a wireless power system transmitter.

6. The method according to claim 5, wherein the charging distance is smaller than or equal to the larger diameter of the flexible wireless power system receiver.

* * * * *